March 31, 1959 J. J. PARKER ET AL 2,880,005
DUAL SPLINE CHUCK
Filed March 13, 1957
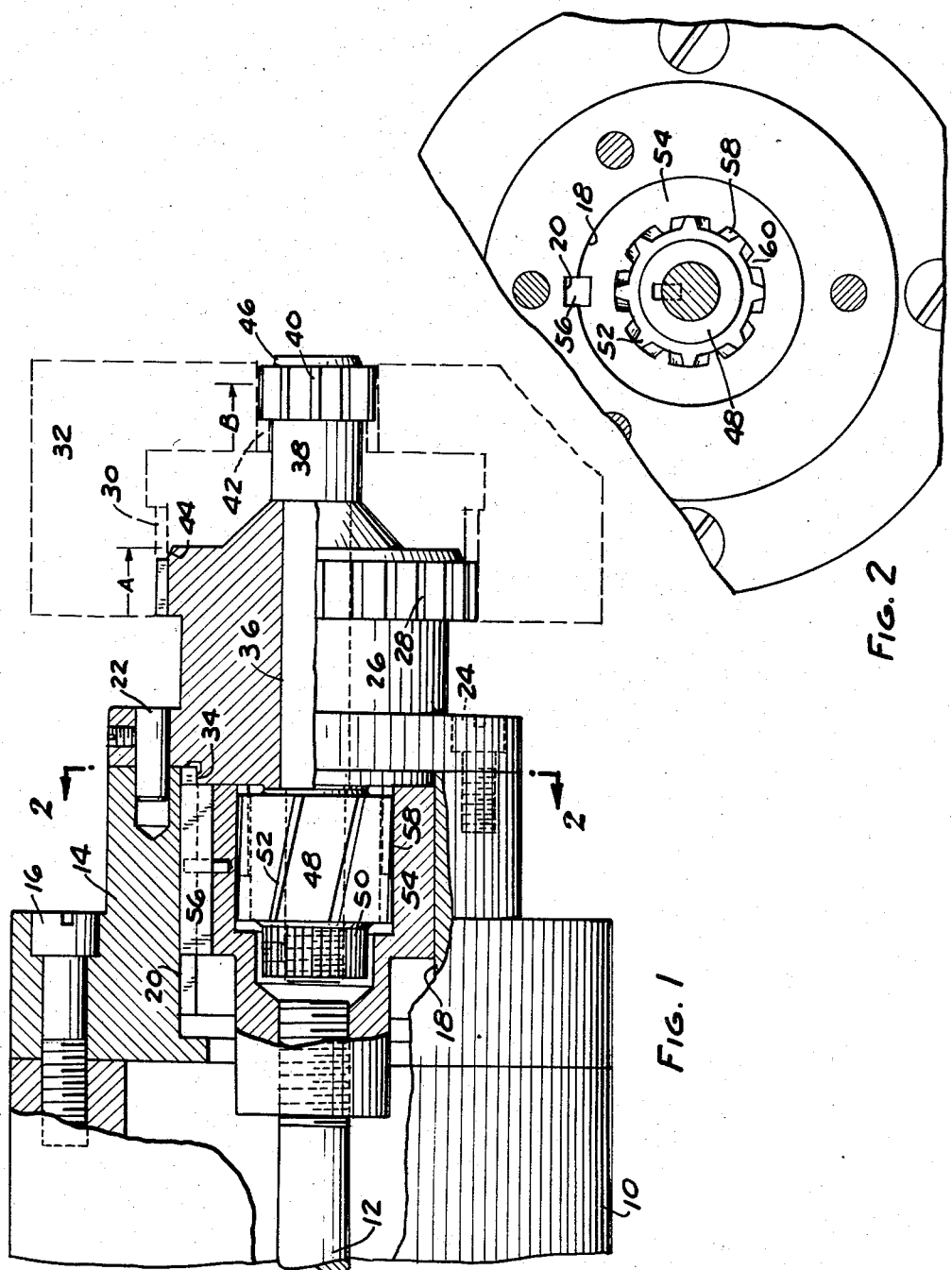
INVENTORS
JOHN J. PARKER & LONDON T. MORAWSKI
BY
ATTORNEYS.

United States Patent Office 2,880,005
Patented Mar. 31, 1959

2,880,005

DUAL SPLINE CHUCK

John J. Parker and London T. Morawski, Detroit, Mich.

Application March 13, 1957, Serial No. 645,728

1 Claim. (Cl. 279—1)

This invention relates to a chuck for holding work pieces which are provided with toothed splined surfaces. Where a work piece has two or more splined formations, spaced axially along the work piece, it is frequently desirable to hold the work piece by a chuck which engages these splined formations. When the splined formations have the same diameters, and are not formed by the same forming tool in a single operation, it would be necessary with work holding devices of the prior art to maintain a fixed indexed relation between the teeth of the two splined formations on all work pieces. This requirement of an indexed relation between the splines adds to the cost of manufacture and would, therefore, be advantageously avoided if possible.

It is an object of the present invention to provide a work holding chuck for work pieces having two or more splined conformations, which is capable of engagement with two of those conformations, irrespective of the indexed relationship of the two sets of splined teeth in a particular work piece.

A further object of the invention is to provide a work holding chuck of this character which will engage the work upon the surface of the splined teeth with a minimum of eccentricity tolerance.

Another object is to provide a chuck of the character described in which the work piece may be readily engaged with the chuck by a simple manual operation requiring little dexterity.

It is also an object to provide a chuck of this character which is simple and rugged and which can be produced at low cost.

Further objects and advantages of the present invention will be apparent from the following description, reference being made to the accompanying drawing wherein a preferred form of the present invention is illustrated.

In the drawings:

Fig. 1 is a side view partly in longitudinal section of a work holding mechanism incorporating a preferred form of the present invention.

Fig. 2 is a fragmentary sectional view on the line 2—2 of Fig. 1.

In the embodiment shown, a hollow tool spindle 10 has a longitudinally shiftable actuator rod 12 which extends through the spindle and may be moved to the left or back into the right hand position illustrated in Fig. 1. This may be done by any suitable mechanical or fluid-operated device, not shown.

Secured to the end face of the spindle 10 is a body member 14 which is fastened thereto by means of recessed cap screws 16. The body 14 is provided with a central bore 18 having a keyway 20. Secured to the right hand face of the body member 14 by a dowell 22 and cap screws 24 is a first splined work holding element 26. The element 26 has a series of male splined teeth 28 which slideably fit the female splined conformations 30, in work piece 32 shown in dashed lines in Fig. 1. The element 26 has a pilot 34 engaged with the bore 18 and is provided with a central bore 36.

Mounted in the bore 36 is a second splined work holding element 38, having a toothed male spline 40 on one end thereof. The spline 40 is engaged with the female spline 42 of the work piece 32. Each of the splined work holding elements is provided with a short tapered nose section 44 and 46 respectively, which act as guides for facilitating engagement of the splines.

The axial length and spacing of the teeth on the two splined work holding elements is such that the work piece 32 does not engage both splines at the same time when it is being placed upon the chuck. Thus, if the work piece 32 were in a position to the right of the position shown by a distance represented by the arrow A, the spline 30 would not be in engagement with the spline 28. However, as will be seen from the arrow B which is the same length as arrow A, the splines 40 and 42 are engaged at this position of the work piece.

The second splined work holding element 38 is secured by a keyed connection, not illustrated, to a rockable member 48, a nut 50 serving to hold the member 48 securely upon the element 38. The member 48 is provided with a series of helical splined teeth 52 on its outer surface. The teeth 52 are spaced from each other by substantially normal tooth spacing, usual in splines of this character. Slideably mounted within bore 18 is a shuttle member 54 which is threaded to the actuator rod 12, and serves as a means to actuate the rockable member 48. For this purpose, the shuttle 54 is provided with a key 56 slideable in keyway 20. The shuttle 54 is also provided with an internally splined bore 58 having helical splined teeth 60 which co-operate with the splined teeth 52. As will be apparent from Fig. 2, the teeth 60 are substantially twice the normal spacing so that the net result is to allow an angular back-lash between the members 48 and 54. The amount of this back-lash is chosen so that it is at least as great as the range of possible indexing variation between the teeth of the splines 30 and 42 of the work piece 32.

In operation, the actuator rod and shuttle member 54 are shown in their released position in Fig. 1, that is, that the shuttle is all the way to the right in its bore 18 of the body member 14. The work piece may then be positioned upon the work holding splines 28 and 40 by first engaging the splines 42 with the splines 40. There is no interference at this time from the splines 28—30 because the latter are not yet in engagement. Further shifting of the work piece to the right will bring the splines 28 and 30 into engagement and, should there be interference between the teeth because of the angular position of the work piece, the latter may be readily shifted angularly so that the splined teeth 28—30 may be readily engaged.

When the work piece has been moved to the left into the position shown in Fig. 1, a stop, not shown, being customarily provided for this purpose, the actuator rod 12 may be shifted to the left. This causes the back-lash between teeth 52 and 60 to first be taken up. Thereafter, the helical teeth 60 engage the teeth 52 and, because shuttle 54 is keyed to the body 14, the member 48 is therefore rocked, causing relative rotation of the splines 28 and 40. This creates a clamping action on the work piece so as to hold it tightly upon the two splines.

Machining operations may then be conducted as desired, with the reference surface for such operations being the two splined formations 30 and 42, upon which the work piece is thus chucked. When the machining operations have been completed, the actuator 12 will again be shifted to the right, releasing the clamping torque on the rockable member 48 and then permitting the work piece 32 to be manually slipped off from the work holding element.

It will be seen that the present invention provides an improved chuck of simple construction in which a multi-splined work piece may be reliably clamped, using splined surfaces of random tooth index, as the reference surfaces for machining operations. The invention further provides this advantage in a chuck of simple and rugged construction which may be manufactured at low cost.

While the form of embodiment of the invention as herein described constitutes a preferred form, it is to be understood that other forms might be adopted, all coming within the scope of the claim which follows.

What is claimed is as follows:

A chuck for holding a work piece having two axially spaced splined formations of different diameters so that machine operations may be performed thereon comprising a body member, a first work-holding element secured to the body member and having a splined portion fixed thereon for engaging one of the splined formations on the work piece, a rockable member mounted for oscillation on the body member, a second work-holding element fixedly secured to the rockable member for movement therewith and having a splined portion for engaging the other splined formation on the work piece, said splined portions being of different diameters and spaced apart axially so that they are non-coextensive in axial extent, an actuator member for the rockable member shiftable in the body member, said rockable member and said actuator member having interengaging teeth thereon helically arranged so that when the actuator member is shifted in the body member, said rockable member is oscillated and the two splined portions are angularly moved relative to one another, the spacing between the teeth on said rockable member and actuator member being substantially greater than the width of the teeth, whereby excessive back-lash and angular lost motion are provided between the rockable member and the actuator member, said two splined portions being freely relatively angularly movable within the extent permitted by the spacing between said teeth, whereby the two splined portions can be indexed relative to one another to correspond with the spline pitch of the two splined formations on the work piece independent of any movement of said actuator member.

References Cited in the file of this patent

UNITED STATES PATENTS

| | | |
|---|---|---|
| 2,658,764 | Parker et al. | Nov. 10, 1953 |
| 2,678,824 | Parker et al. | May 18, 1954 |
| 2,681,805 | Parker et al. | June 22, 1954 |
| 2,762,629 | Dalby | Sept. 11, 1956 |